United States Patent [19]
Alling

[11] 3,994,546
[45] Nov. 30, 1976

[54] THRUST BEARING WITH LOCKING TABS

[75] Inventor: Richard Lassen Alling, Torrington, Conn.

[73] Assignee: The Torrington Company, Torrington, Conn.

[22] Filed: Oct. 16, 1975

[21] Appl. No.: 622,799

[52] U.S. Cl. ............................................. 308/235
[51] Int. Cl.² .................................... F16C 33/38
[58] Field of Search ................. 308/235, 217, 218

[56] References Cited
UNITED STATES PATENTS

| | | | |
|---|---|---|---|
| 1,053,413 | 2/1913 | Lockwood | 308/235 |
| 1,411,303 | 4/1922 | Schmidt | 308/235 |
| 1,915,118 | 6/1933 | Brown | 308/217 |
| 3,913,994 | 10/1975 | Alling et al. | 308/235 |
| 3,937,541 | 2/1976 | Alling et al. | 308/235 |

*Primary Examiner*—Philip Goodman
*Assistant Examiner*—Gene A. Church
*Attorney, Agent, or Firm*—F. S. Troidl

[57] ABSTRACT

This is a two-piece roller thrust bearing cage. Two retainer members, each with a plurality of circumferentially separated pockets which are aligned, are held against relative circumferential movement by one or more locking tabs extending from one retainer member into one or more pockets in the other retaining member.

6 Claims, 7 Drawing Figures

THRUST BEARING WITH LOCKING TABS

This invention relates to two-piece thrust bearing cages. More particularly, this invention is a new two-piece roller or needle roller thrust bearing cage or retainer including locating and locking tabs on one of the retaining members for preventing relative rotation of the two retaining members.

With a two-piece roller thrust bearing cage some means must be provided to prevent relative rotation of one piece with respect to the other piece so that the pockets in the two pieces are kept properly aligned. In the making, assembling, and using of many currently used two-piece thrust bearing retainers, in addition to the pockets formed for retaining and guiding the rollers, one or more projections are formed on one rim of one of the retaining members and these fit into cooperating one or more slots or holes formed in the other retaining member to locate the cage halves relative to one another and to prevent the relative rotation. This, of course, may require an extra operation and does require extra tooling over and above the operations and tooling required to form the pockets.

This invention eliminates the extra operations and tooling required in the making and assembling of presently known thrust bearing cages by providing at least one locking tab on one retaining member which will fit into a roller pocket of the other retaining member. Thus with this invention the pockets, which have already been formed, are utilized to prevent relative rotation of the two retaining members, thus eliminating the need for forming the extra slots. It also eliminates the need to have the two retaining members in one exact rotational position relative to each other and lets the tabs locate in any of the pockets of the opposed piece.

The invention as well as its many advantages may be further understood by reference to the following detailed description and drawings in which.

In the various figures, like parts are referred to by like numbers.

Figure 1:
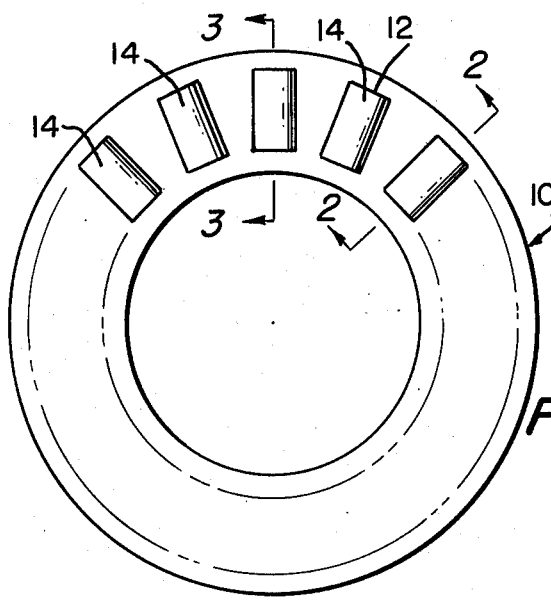
FIG. 1 is a front view of a roller thrust bearing.
Figure 7:
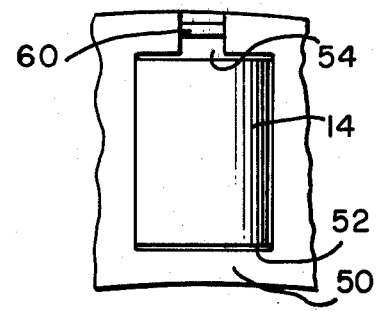
FIG. 7 is a fragmentary front view of the embodiment of FIG. 6.

Referring to the drawings, and more particularly to FIG. 1, an annular thrust bearing cage 10 is shown containing a plurality of circumferentially spaced pockets 12 with a roller 14 located in each of the pockets 12.

Figure 2:
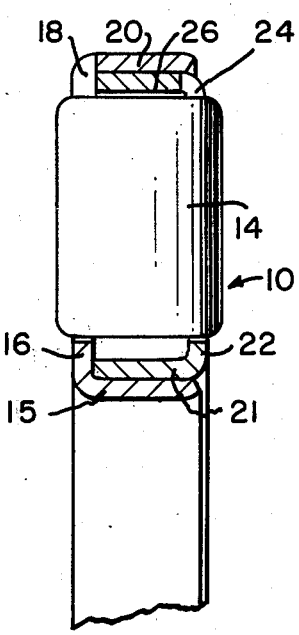
FIG. 2 is a view on an enlarged scale taken along lines 2—2 of FIG. 1 and in the direction of the arrows.

As shown in FIG. 2, the two-piece bearing cage includes a first retainer member 15 having a flat annular portion 16 with a plurality of circumferentially separated pockets 18. In the embodiment shown the pockets 18 extend at least a portion of the way into the outer axial flange or rim 20 on the retaining member 15. Pockets 18 are often called wrap-around pockets when they extend into the axial flange.

The second retaining member 21 also as a flat annular portion 22 with wrap-around pockets 24 with a portion of the wrap-around pockets 24 extending into the axial flange 26 of the second retaining member. Each of the two retainer members are approximately C-shaped in cross section.

Figure 4:
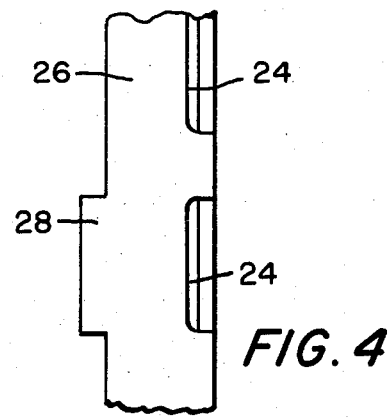
FIG. 4 is a partial view taken generally along lines 4—4 of FIG. 3.
Figure 3:
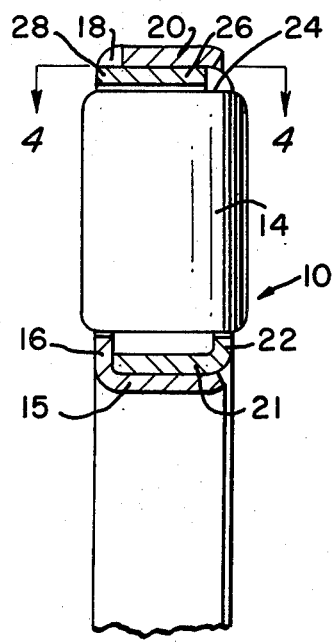
FIG. 3 is a view on an enlarged scale taken along lines 3—3 of FIG. 1 and in the direction of the arrows.

As shown in FIG. 3 and FIG. 4, a locating or locking tab 28 is integral with and extends axially from the free end of the flange 26. Preferably two circumferentially spaced locking tabs 28 are provided on the flange 26. However, one locking tab may be used, or more than two locking tabs may be used.

As clearly shown in FIG. 3, the locking tab 28 extends into the pocket 18 in the flat annular portion 16 of the first retainer member. Thus, the two retainer members are prevented from rotating with respect to one another and the pockets 18 and 24 are kept in proper alignment. This is accomplished by utilizing one or more pockets in one of the retaining members for receiving locking tabs without the need of providing additional slots for receiving projections as was the case with some two-piece thrust bearing cages used before this invention.

Figure 5:
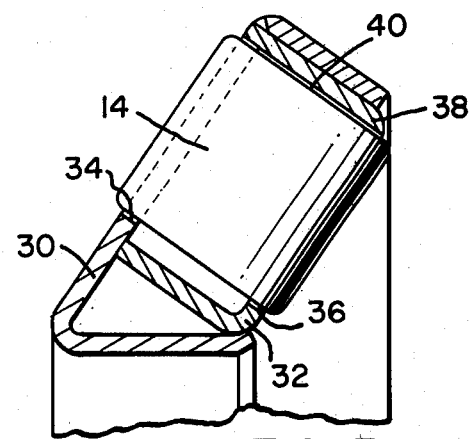
FIG. 5 is a sectional view illustrating a second preferred embodiment of this invention in the form of a conical thrust bearing.

FIG. 5 shows a modification of this invention and is a conical bearing two-piece cage. In the conical bearing two-piece cage the flat portion 30 of the first retainer member is inclined with respect to the radius of the cage, and the flat portion 32 of the second retainer member is also inclined with respect to the radius. The circumferentially spaced pockets 34 in flat portion 30 and the circumferentially spaced pockets 36 in the flat portion 32 are aligned. The two retainer members are prevented from rotating with respect to one another by the locking tab 38 on the conical flange 40 of the first retainer member extending into a pocket 36 of the second retainer member. Preferably two locking tabs 38 are provided, but one locking tab or more than two locking tabs may be used if desired.

Figure 6:
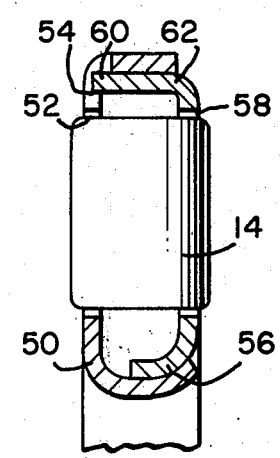
FIG. 6 is a side view, partly in section, showing a third preferred embodiment of the invention.

FIG. 6 shows a two-piece thrust bearing cage with one retainer member 50 having stepped pockets. Each pocket includes a larger width portion 52 for retaining rollers 14, and a smaller width portion 54. The other retainer member 56 has pockets 58 for retaining rollers 14 aligned with the pockets in retainer member 50. One or more tabs 60 on outer flange 62 of retainer member 56 extend into a smaller width portion 54 of the pockets in retainer member 50.

Although the locking tabs have been shown in each case as being on the outer flange of one retaining member, they may alternatively, or in addition, be placed on the radially inner flange to locate at the inner end of the pocket instead of the outer end.

I claim:

1. A roller thrust bearing cage comprising: a first retainer member having a flat portion with a plurality of circumferentially separated pockets; a second retainer member having a flat portion with a plurality of separated pockets aligned with the pockets of the first retainer member; and at least one locking tab extending from the flat portion of the second retainer member extending into a roller pocket in the first retaining member.

2. A roller thrust bearing cage in accordance with claim 1 wherein there are a plurality of circumferentially spaced locking tabs extending into said pockets.

3. A roller thrust bearing cage in accordance with claim 2 wherein each of the two retaining members are approximately C-shaped in cross section.

4. A roller thrust bearing cage in accordance with claim 3 wherein the flat portions of both retainer members extend radially.

5. A roller thrust bearing cage in accordance with claim 3 wherein the flat portions of both retainer members are inclined with respect to the radius of the apparatus.

6. A roller thrust bearing cage in accordance with claim 1 wherein the pockets of the first retainer member include a larger width portion and a smaller width portion with the locking tab from the second retainer member extending into the smaller width portion.

* * * * *